June 25, 1968  J. T. ROOS  3,389,800
TILTING PAN FILTER RESIDUAL FILTRATE TRAP
Filed Jan. 23, 1967  3 Sheets-Sheet 1

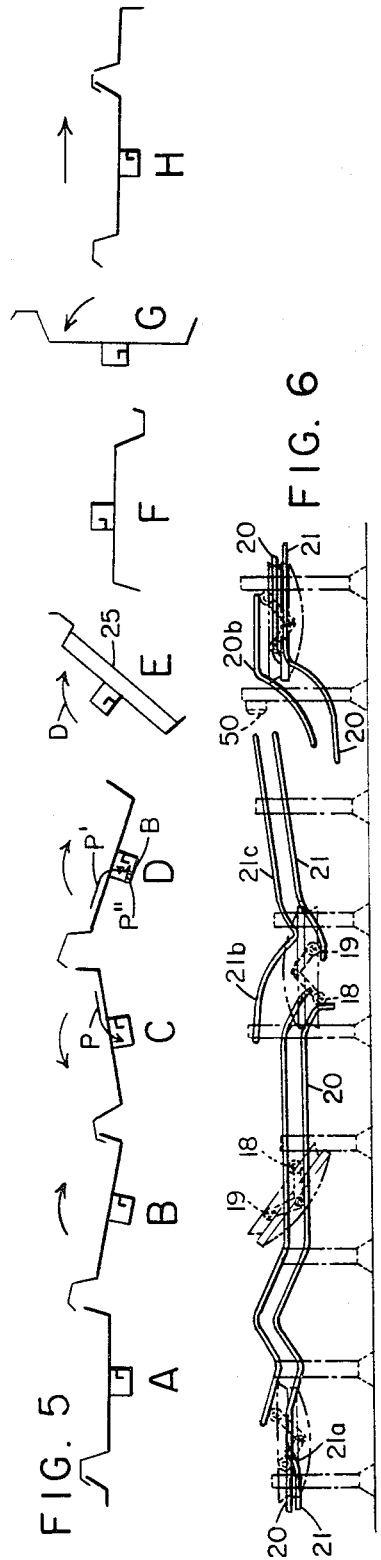
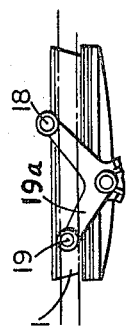
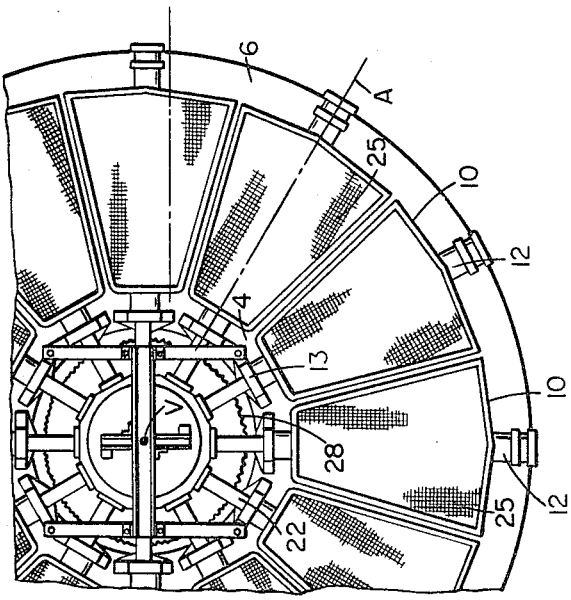

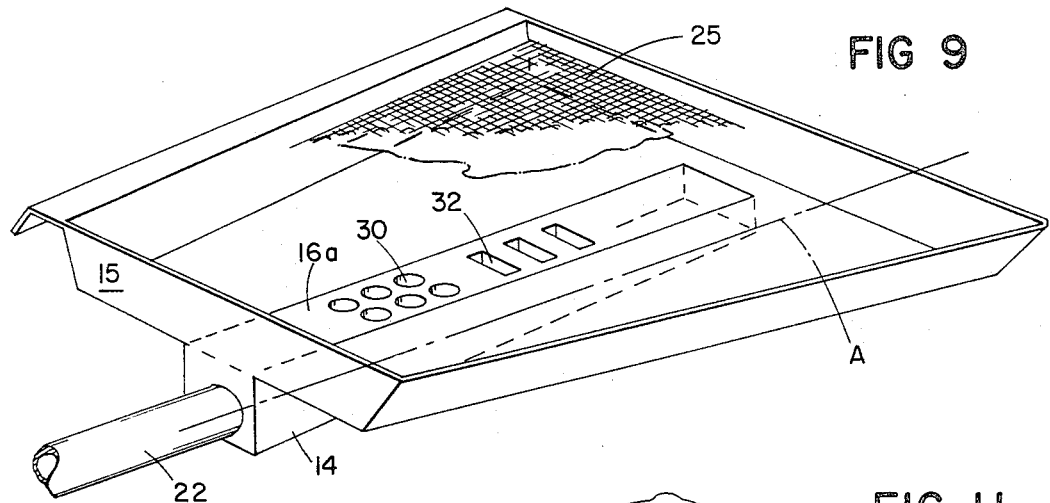
FIG 9
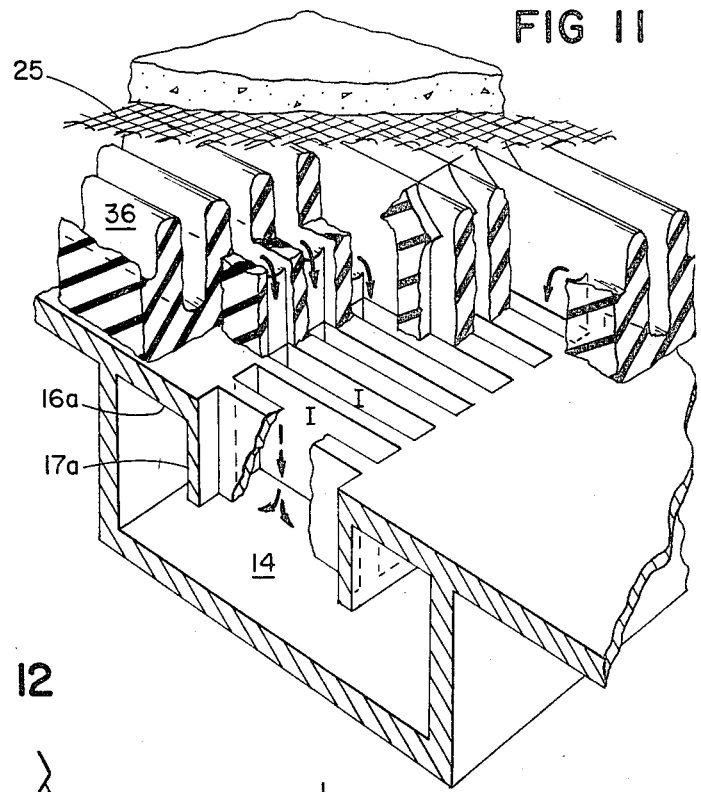
FIG 11
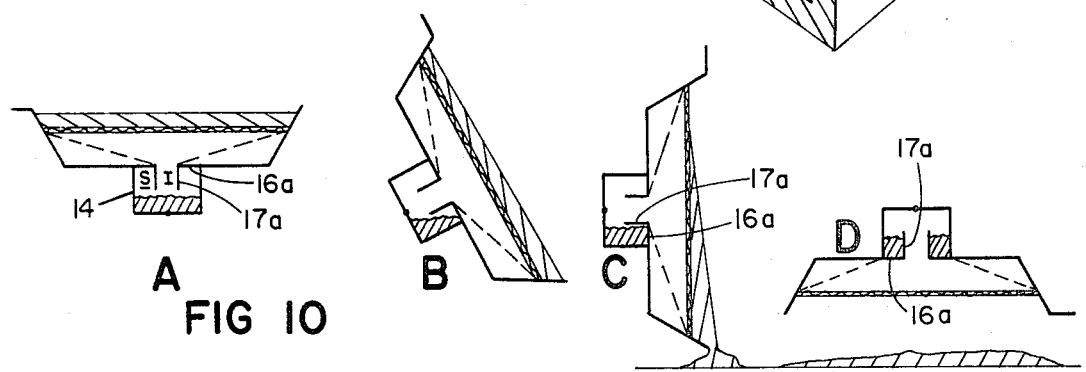
FIG 12
FIG 10

United States Patent Office 3,389,800
Patented June 25, 1968

3,389,800
TILTING PAN FILTER RESIDUAL
FILTRATE TRAP
John Treymann Roos, Westwood, Mass., assignor to Bird
Machine Company, South Walpole, Mass., a corporation of Massachusetts
Continuation-in-part of application Ser. No. 546,020,
Apr. 28, 1966. This application Jan. 23, 1967, Ser.
No. 610,871
9 Claims. (Cl. 210—328)

ABSTRACT OF THE DISCLOSURE

A horizontal tilting pan filter having a trap in the drain region which is constructed and arranged to retain residual filtrate and prevent the backflow and rewetting of the filter medium and solids when the pan is tilted for discharge of the solids.

This application is a continuation in part of application Ser. No. 546,020 filed Apr. 28, 1966 and now abandoned.

This invention relates to horizontal tilting pan cell filters such as are employed in the production of phosphoric acid.

A principal object of the invention is to decrease the cost of filtration and improve the separation of liquids from solids.

A particular object is to provide a filter having a simple and inexpensive cell construction, yet capable of highly efficient filtration.

Another object is to provide a filter capable of producing large quanties of filtrate with minimal retention of filtrate in the filter cake.

A typical tilting pan filter comprises a multiplicity of side-by-side filter pans mounted for movement through a number of stations. The pans may be mounted between concentric supporting rims which rotate bodily about a vertical axis. Each pan provides a substantial flat area of filter medium for supporting a charge of solids and liquid when horizontally disposed, and each pan has a vacuum drain region below the filter medium to collect and remove liquid which passes through the filter medium. Each pan is mounted upon a substantially horizontal axis and turns about this axis from the horizontal filtering position to a tilted position for solids discharge.

According to the invention, a trap means is located above the floor of the drain region and is arranged to collect and contain liquid residing in the drain region as the pan tilts, thus to prevent residual liquid in the drain region from contacting the under surface of the filter medium and rewetting the solids as tilting progresses for solids discharge.

In this invention the tilting action of the filter pan or cell may be used to create an appreciable slope to accelerate trapping of the filtrate, the trap being located on the side of the drain region toward which the pan tilts for solids discharge. In the case of a corner outlet pan, FIGS. 1 and 2(B), or a false bottom cell sloped both ways, FIGS. 1 and 2(C), it would only be necessary, for trapping the liquid, to tilt the cell in the direction the cell would rotate to discharge filter cake. In the case of cells employing a central collecting trough which in turn drains to the center of the inside of the cell, the cell may first be tilted opposite to the direction of discharge in order to trap filtrate from that half of the cell which would slope away from the central collecting trough when the cell is turned over to discharge filter cake. The invention includes the provision of tilting mechanism capable of imparting the appropriate tilting motion.

Another embodiment of the invention features a trap in the form of an upper closure for the drain region, with filtrate inlet passages defined by downwardly extending walls which project (in the filtering position) below the closure. Upon inversion, the liquid is prevented from reaching the filter medium by the closure, and cannot backflow through the inlet passages because of the projection of the walls defining the passages.

From the standpoint of design and manufacture, it has been generally proven that the larger the individual cells or pans can be made, the less expensive the cost the filter will be in terms of the cost per unit of active filtration area. Likewise it has been proven that cells with minimum or no slope are less expensive to manufacture and such cells also minimize the filter floor space requirements. But relatively wide and relatively flat bottomed cells are capable of retaining an appreciable amount of filtrate just prior to inversion for discharging filter cake.

The present invention prevents such retained filtrate, as well as filtrate retained by sluggish hydraulic conditions due to low filtrate flows, from rewetting the filter cake when a cell is turned over to discharge filter cake. In practicing this invention, residual filtrate in a cell which would have otherwise rewetted the filter cake is trapped in the cell by the turnover motion. It can be released automatically when the cell is turned substantially upright again.

In the figures:

FIGS. 1A–D are diagrammatic plan views and FIGS. 2A–D are diagrammatic end views, respectively, of filter cells having the trap of the invention.

FIG. 4 is a plan view of a typical rotary filter having a multiplicity of cells.

FIG. 5 is a schematic view illustrating the various positions of a cell as it operates according to the invention.

FIG. 6 is a partially diagrammatic developed side view of one type of cell tilting mechanism, a cam track suitable for imparting the cell motions illustrated in FIG. 5.

FIG. 7 is an end view of a cell cam construction suitable for use with the cam track of FIG. 6.

FIG. 9 is a perspective view, partially broken away, of another preferred embodiment of the invention, illustrating downwardly projecting walls forming an inlet to a collection manifold, and serving to trap the liquid when the cell is tilted;

FIG. 10 illustrates diagrammatic views similar to positions A, D, E, and F respectively of FIG. 5, illustrating the operation of the embodiment of FIG. 9.

FIG. 11 is a cross-sectional, partially broken away view on a larger scale of a portion of another embodiment similar to that of FIG. 8.

FIG. 12 illustrates diagrammatic views of other types of filter pans employing the downwardly projecting wall feature.

Figure 1A:
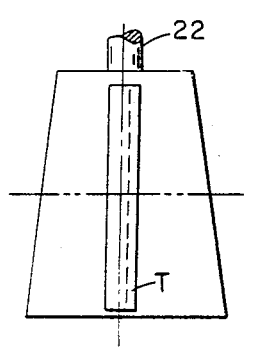
FIGS. 1A and 2A illustrate an open grid cell construction having channels which report to a centrally located outlet trough.

According to the invention the trap member need be only an elongated sheet metal member secured in an appropriate location, or a duct or series of pipes mounted on a wall, depending upon the particular type of cell involved, to form a container open to receive fluid from the cell, and constructed to contain the liquid and prevent back-flow up to the maximum tilt of the cell, preventing the liquid from reaching the filter medium.

The importance of the trap member cannot be fully-appreciated without consideration of the numerous competing factors involved in the design of a filter cell, and accordingly a brief description will be given:

(1) The active filtration area of a filter is the governing factor as to the capacity of the filter.

(2) Rewetting of the filter medium, and thus the solids cake, at the time of solids discharge decreases the efficiency of filtration.

(3) After a slurry charge to the filter has been filtered, the residue liquid in the filter cell can be removed by gravity drainage and air-purging, using the vacuum line and air passing through the filter medium.

(4) Substantial slope on the bottom of filter cells is detrimental because it increases the overall height of the cell, and thus increases the space or gap required between cells to permit them to clear each other during turnover. Increase in gap size decreases the active filtration area.

(5) If rewetting were no problem, larger overall size of the filter and its cells would provide a substantially more efficient filter in terms of active filtration area compared to capital cost.

According to the invention it was realized that extreme sloping of large pan filters to remove residue liquid should not be employed because of area loss due to gap size, and that a much more effective solution to the problem lay in allowing the liquid to remain in the cell, but held in a trap. This prevents rewetting, assures eventual removal of the residue liquid, and makes practical the use of much larger size filter cells.

It should be understood that the relationship of the trap to the filter cell is important. In preferred embodiments of rotary filters each cell is wedge shaped, and elongated in the direction of the horizontal axis about which it tilts. The trap is also of an elongated nature. Advantageously it extends substantially parallel to the direction of elongation, and is located either in a central trough that is lower than the remainder of the drainage region, or in the region of the outside edge, at the most distant point from the horizontal axis, on the side which moves downward when tilting for solids discharge begins.

Referring now to FIGS. 1 and 4, there is shown one example of rotary filter to which the present invention applies. A multiplicity of filter cells (cell 1 in FIG. 3) are mounted on inner and outer concentric rims 4, 6 for bodily rotation about vertical axis V, gear 28 engaged with a pinion. Each cell has a central drain connection 22. Each cell is mounted on bearings 12, 13 for tilting about horizontal axis A. The tilting mechanism, not shown in FIG. 4, is preferably located in the vicinity of outer cell edge 10, all as is well known.

Figure 8:
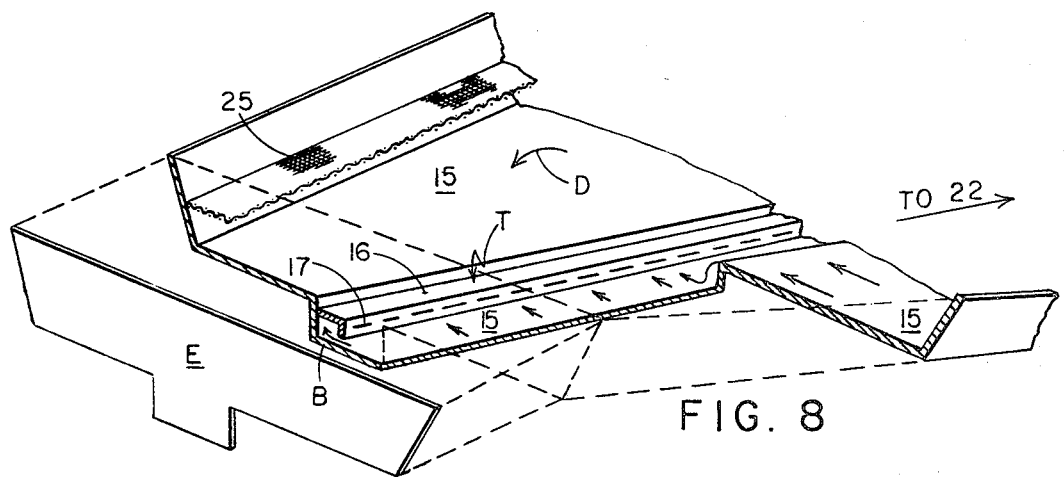
FIG. 8 is a perspective view, partially broken away, for a preferred embodiment of a cell for use according to the invention.
Figure 3:
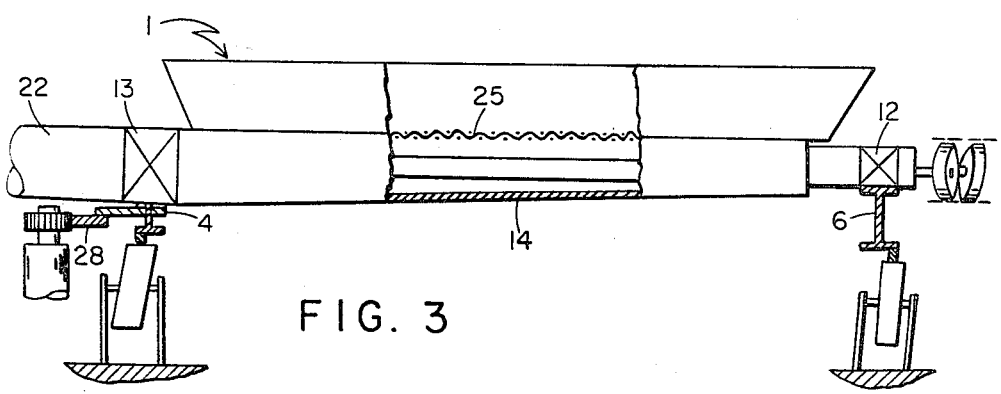
FIG. 3 is a side view of a typical cell and its mounting structure.

Referring to FIGS. 3 and 8, a cell suitable for use in the filter of FIG. 4 is shown. This particular cell has a central collector and drain trough or manifold 14, sloped to outlet 22, and flat pan bottom element 15 (FIG. 8) at a higher level than the trough.

The direction D of tilt about axis A for solids discharge is indicated in FIG. 8.

According to this embodiment of the invention the trap comprises a horizontal plate member 16 and a vertical plate member 17. Plate member 16 is located above the bottom B of the portion of the drain region in which it is located, and extends in the opposite direction to D, from a wall defining that region. Plate 17 is joined to the free end of plate 16, forming a lip, and extends toward bottom B. Thus, on tilting of the cell, the mounting wall, plate 16 and plate 17 form a trap or container for liquid flowing along bottom B as indicated by the arrows in FIG. 8. The ends of the trap can be closed, as by end plates E, and thus liquid will be confined and prevented from reaching filter medium 25, until the cell is returned to filtering position.

Figure 2A:
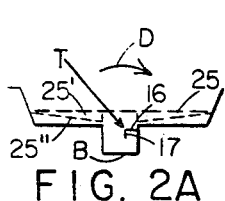

The set of FIGS. 1 and 2 illustrate some of the possible configurations, according to the invention;

FIGS. 1A and 2A illustrate the same cell as FIG. 8, except adapted for opposite rotation. The filter medium 25 can be supported by ribs 25', between which are channels 25'' sloping to the central collector, as is known.

Figure 1B:
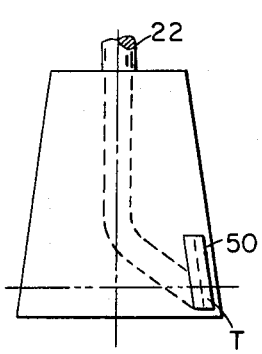
FIGS. 1B and 2B illustrate a false bottom cell construction having a substantially flat bottom which drains into an outside corner or side outlet box.
Figure 2B:
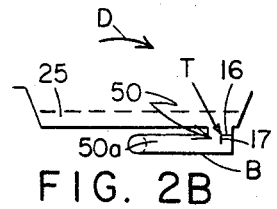

FIGS. 1B and 2B illustrate a false bottom construction in which the filter medium 25 is self supporting, e.g., it incorporates a false bottom wire support that is secured to the side walls. The drain region under the filter medium includes an outside corner outlet box 50 which is elongated in the radial direction of the filter, to which all filtrate flows as tilting begins. The trap T is located in this outlet box, above its bottom, and traps residual liquid from the cell and from drain leg 50a as the cell tilts.

Figure 1C:
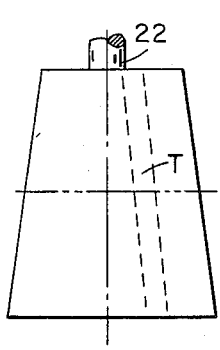
FIGS. 1C and 2C illustrate a false bottom cell construction having a bottom which drains both toward the center of the pan and also toward the center of the inside edge of the pan.
Figure 2C:
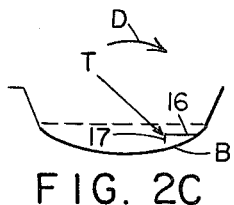

FIGS. 1C and 2C illustrate a false bottom, similar to FIGS. 1B and 2B, but with a bottom which slopes downwardly toward the center of the pan, shown, as well as downwardly toward the inside edge and drain connection 22, slope not shown.

Figure 1D:
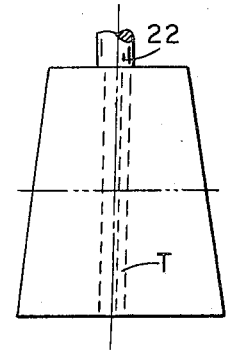
FIGS. 1D and 2D illustrate a false bottom cell or pan construction having a bottom which drains toward the center of the pan and into a trough which drains to the center of the inside edge of the pan.
Figure 2D:
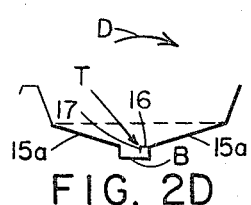

The cell of FIGS. 1D and 2D is similar to that of FIGS. 1C and 2C in having a bottom which slopes toward the center as well as toward the drain connection 22. But in this embodiment an elongated collection trough is located along the center line, lower than the bottom sections 15a, and the trap T is provided in this trough.

It is believed that the central collector trough constructions of FIGS. 2A and 2D are the most efficient for large cell construction, and it will be seen that the unique combination of the trap in the trough is a particularly effective means for dealing with the residual liquid.

FIG. 5 shows diagrammatically a preferred sequence of pan positions, according to the invention, and FIG. 6 shows a tilting mechanism which can produce this sequence.

It will be understood that no novelty is asserted for any particular tilting mechanism per se, except insofar as it produces the trapping of liquid.

In one example of a suitable tilting mechanism, referring to FIG. 7, the cell 1 may be provided, at its outer end, with a cam arm 19a, mounting a pair of cams 18 and 19.

Referring to FIG. 6, cam 19 is confined in a path defined by rails 20, 21 to maintain the normal dewatering position of the pan as shown in FIG. 5A. At the end of normal dewatering an upward sloping extension 21a of rail 21 tilts the pan slightly, to provide clearance for the pan ahead of it. At this point cam 19 enters a cam path which increases the clearance tilt, as is known.

According to the invention, the pan is then tilted in the opposite direction, to position 5C, to allow residual liquid from the leading side of the filter to follow the path denoted by arrow P, and enter the central trough where it can be trapped.

Next, the tilting mechanism tilts the pan in the opposite direction, to position 5D, to cause liquid from the trailing side of the pan to follow flow path P', and enter the central trough.

It will be observed that paths P and P' are of relatively short length. This together with the tilt assures that the residual liquid can reach the collector in a very short time.

With the pan in position 5D, the residual liquid from path P, collected in the previous position, and the liquid being collected from path P', flows in the direction to the right along the bottom B of the collector, passing under the lip 17, thus entering the trap T.

The pan is then tilted in direction D toward discharge position. It can be seen that the walls 16 and 17 of the trap retain the residual liquid and prevent it from flowing back to the filter medium 25.

Tilting of the pan in direction D continues until the inverted position 5F is reached, at which the solids are discharged from the pan, the residual liquid remaining in the trap.

Upon completion of discharge, and filter medium washing, the pan is returned through position 5G to horizontal position 5H. In this position the trapped filtrate is discharged through the outlet connection 22, and a new charge of slurry is delivered to the pan. Provision can also be made for removing the trapped liquid even when the pan is inverted.

In filtration for phosphoric acid production and the like there is a tendency for solid particles of very small size which inevitably pass through the filter medium to deposit upon surfaces which they contact. By virtue of the location of the trap however in a region of the main filtrate flow during normal filtering, it is believed that the flow will scrub the surfaces of the trap, and prevent unwanted deposits. It will be appreciated that during normal filtering the entire drain region below the filter medium is filled with liquid, the vacuum from the drain connection 22 pulling the liquid through the drain region or collector trough as fast as fresh liquid can pass through the filter medium.

Referring now to the embodiment of FIGS. 9 and 10, there is shown a central collection manifold 14 sloped to a vacuum discharge line 22, the manifold arranged to receive the liquid from a large area of filter medium 25 supported over the pan 15. In this embodiment the upper part of the manifold is closed by laterally extending surface 16a, and through this surface project downwardly-extending walls 17a enclosing inlet passages to the manifold. As can be seen in FIG. 10, the walls 17a project considerably below the lateral surface 16a, leaving a considerable space S laterally to the outside of these walls. As indicated by the round openings 30 and the rectangular openings 32, the inlet passages may have various configurations, in fact a single duct having for instance the widthwise dimension of passage I as shown in FIG. 10, and being elongated, extending along the length of axis A, could also be employed.

Referring to the sequence of FIG. 10, it will be seen that upon tilting, the liquid is unable to flow back through passage I, being effectively dammed by projecting walls 17a, and shielded from the filter medium by lateral walls 16a.

Referring to FIG. 11, this downwardly projecting wall feature is particularly well adapted to filter constructions and mats such as those described in U.S. Patent 3,216,576, to which reference is made for details. The mat of FIG. 11 of the present disclosure extends throughout the area of the filter pan in FIG. 9, in the same manner as the filter mat shown in FIGS. 1 and 4 of the above patent. The configuration of the ribs and grooves, as shown in present FIG. 11, are preferably the same as shown in FIG. 10a of the above patent.

Preferably the mat member 36 is formed of resilient material and is supported by the floor of the pan. In the region of the manifold 14, closure surface 16a for the manifold also serves as the floor of the pan, and supports the mat member 36. Openings in the central part of the mat member place the grooves of the mat member into communication with the inlet passages I.

In FIG. 12 are shown filter pans of the various types as shown in FIGS. 2A–D respectively, modified however to incorporate the downwardly projecting wall feature just described.

It will be appreciated that the invention is applicable where either the liquid filtrate or the solid cake is the desired product, saving the valuable liquid or preventing contamination of the solids cake. It will also be appreciated that the filter pans can tilt rearwardly rather than forwardly, with respect to the direction of bodily rotation of the filter, when they move toward their solids discharge position.

Numerous modifications can be made in the specific details within the spirit and scope of the invention.

What is claimed is:

1. A horizontal tilting pan filter comprising a multiplicity of side-by-side filter pans mounted to move through a series of stations, each pan providing a substantial, flat area of filter medium for supporting a mass of solids and liquid when horizontally disposed, a vacuum drain region below each said filter medium to collect and remove liquid which passes through said filter medium, each pan mounted upon a substantially horizontal axis to rotate independently from the horizontal filtering position to a substantially tilted position for solids discharged, and a trap means located above the floor of each said drain region, said trap means constructed and arranged to retain residual filtrate residing in said drain region during the tilting of said pans so that, in cooperation with gravitational force during the tilting of said pans, said trap means prevents residual filtrate from flowing back to and rewetting said filter medium.

2. The apparatus of claim 1 wherein each said filter pan includes a collecting manifold to collect liquid after it passes through said filter medium, said trap means arranged to prevent residual filtrate in the manifold from contacting said filter medium when said pan is tilted.

3. The apparatus of claim 2 having downwardly extending walls enclosing an inlet passage into said manifold from said filter medium, said walls projecting downwardly beyond a surface which closes said manifold in the manner that when said pan is tilted, residual filtrate is retained by said surface and prevented by the projecting wall from flowing back into said inlet passage.

4. The apparatus of claim 3 wherein said filter pan includes a resilient mat member having ribs and grooves, said mat member supporting said filter medium in a horizontal plane during filtering, the grooves discharging through said passage into said manifold, said surface which closes said manifold serving to support the portion of said mat lying over said manifold.

5. The apparatus of claim 3 wherein said downwardly extending walls comprise a series of hollow tubes defining a multiplicity of inlet passages.

6. The apparatus of claim 1 wherein said drain region provides an elongated flow path generally parallel to the horizontal axis of rotation, said trap means being an elongated member and extending substantially parallel to said axis, said trap member located on the side of said drain region which moves downwardly upon the beginning of tilting of each said pan from filtering position toward solids discharge position.

7. The apparatus claimed in claim 6 in which a portion of said drain region is spaced further below said filter medium in the filtering position than the remainder of said region and said trap member is in said lower portion.

8. The apparatus claimed in claim 7 in which said lower portion is positioned away from the longitudinal sides of each said pan and in which means engaging said pans additionally are included for sequentially tilting each said pan from said horizontal position first in the direction reverse to the solids discharge direction and then in said solids discharge direction whereby liquid on each side of said lower portion of said drain region is directed therein prior to solids discharge.

9. The apparatus claimed in claim 7 in which said lower portion of said drain region is positioned substantially along said horizontal axis of the pan.

References Cited

UNITED STATES PATENTS

| Re. 24,150 | 5/1956 | Delruelle | 210—328 X |
| 3,139,404 | 6/1964 | Stock | 210—328 X |
| 3,216,576 | 11/1965 | Roos | 210—328 |
| 3,327,860 | 6/1967 | Lyle et al. | 210—328 |

SAMIH N. ZAHARNA, *Primary Examiner.*

R. FRIEDMAN, *Examiner.*

W. S. BRADBURY, *Assistant Examiner.*